A. W. TIBBALS & C. D. YOUNG.
HEATER FOR INCUBATORS.
APPLICATION FILED NOV. 21, 1910.
1,015,361.
Patented Jan. 23, 1912.
2 SHEETS—SHEET 2.
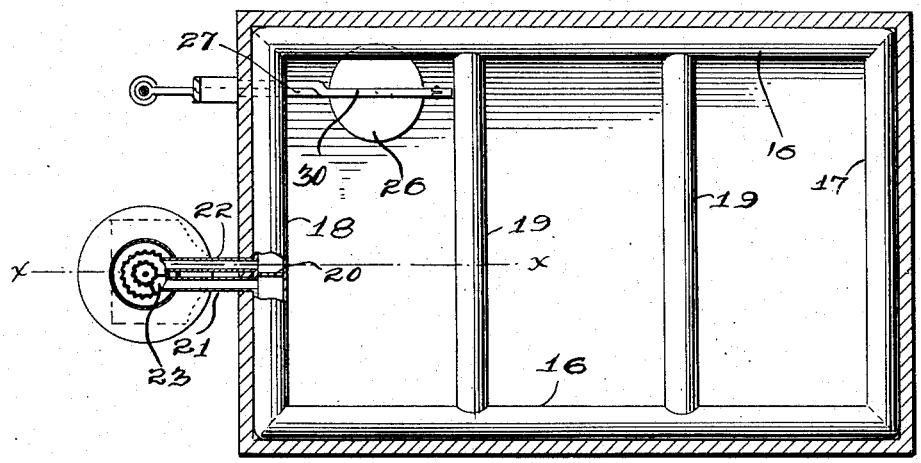
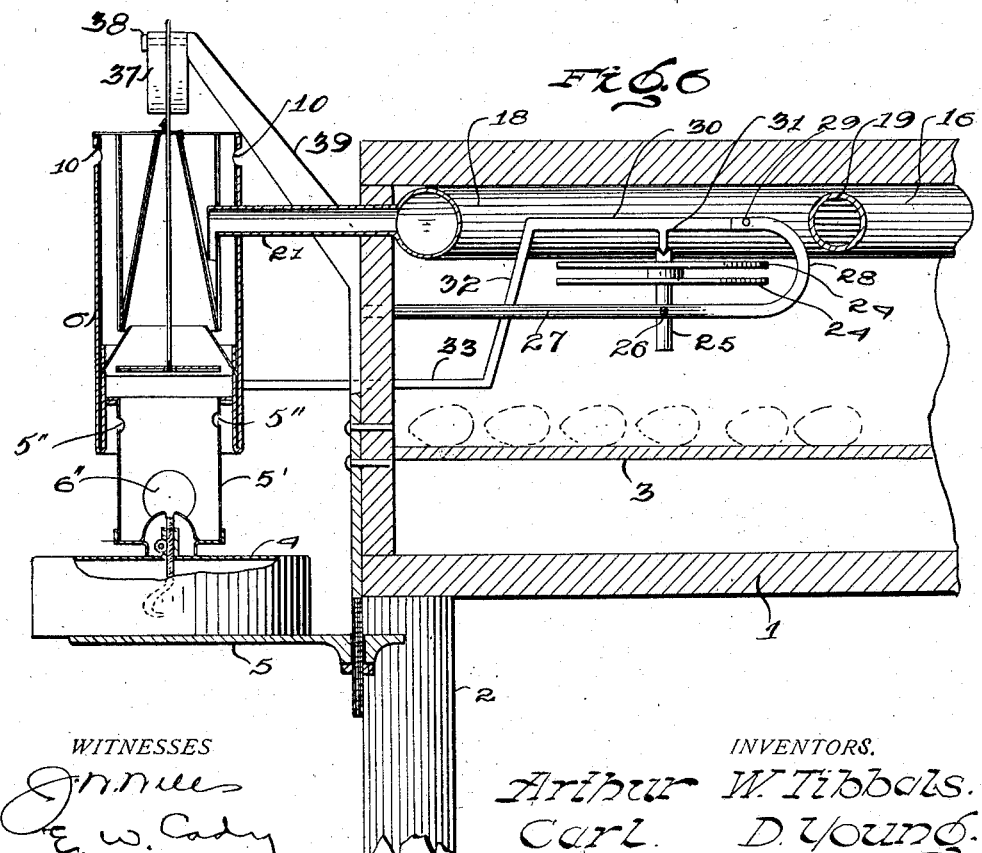
WITNESSES
INVENTORS.
Arthur W. Tibbals.
Carl D. Young.
By C. C. Vrooman
Attorney

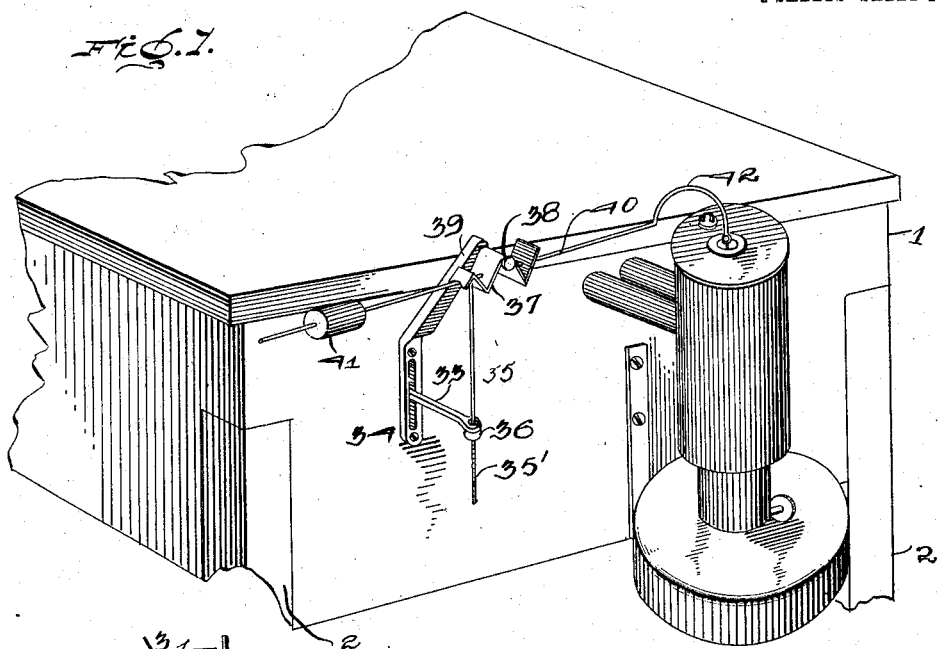
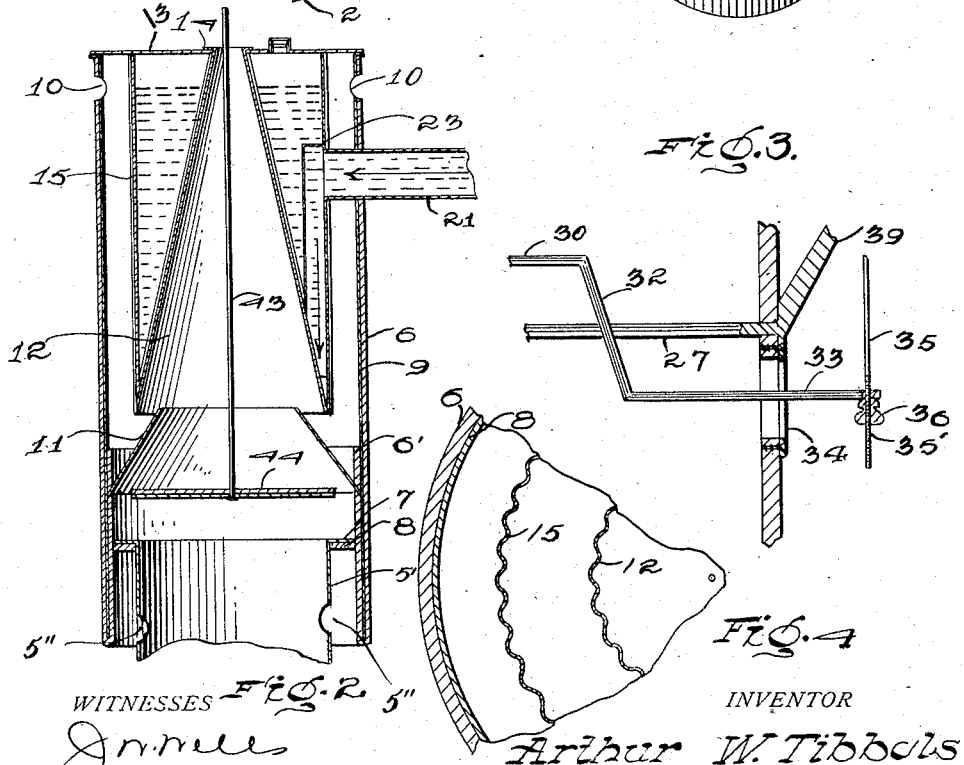

UNITED STATES PATENT OFFICE.

ARTHUR W. TIBBALS AND CARL DWIGHT YOUNG, OF DELAWARE, OHIO.

HEATER FOR INCUBATORS.

1,015,361.     Specification of Letters Patent.     Patented Jan. 23, 1912.

Application filed November 21, 1910. Serial No. 593,521.

*To all whom it may concern:*

Be it known that we, ARTHUR W. TIBBALS and CARL DWIGHT YOUNG, citizens of the United States, residing at Delaware, in the county of Delaware and State of Ohio, have invented certain new and useful Improvements in Heaters for Incubators, of which the following is a specification, reference being had therein to the accompanying drawing.

This invention relates to incubators and has special reference to heaters for incubators provided with means for automatically shutting off the heat from the incubator chamber when a certain temperature is reached therein.

The invention has for its object to provide an incubator heater having improved means for controlling the inlet of heat to the heating tank of the incubator.

The invention has for its object to prevent the incubator from becoming overheated; to utilize less water for heating; to quickly heat the water and cause it to circulate faster and to provide an even heat for all parts of the incubator.

The invention further has for its object to provide an improved incubator heater as hereinafter set forth and claimed, which will be simple in construction and effective in operation.

Referring to the accompanying drawings: Figure 1 is a view in perspective of a portion of an incubator and the heating apparatus therefor, constructed in accordance with this invention. Fig. 2 is an enlarged detail view in vertical section of the water heating tank and its connections. Fig. 3 is a detail view of a portion of the thermostat mechanism. Fig. 4 is an enlarged detail view of a portion of the heating tank in horizontal section. Fig. 5 is a plan view of the incubator chamber with the top removed. Fig. 6 is an enlarged view in longitudinal section of a portion of the incubator and in vertical section of the heating tank and heater mounted on the outside of the incubator on the line X—X, Fig. 5.

In carrying out the invention a casing 1 is provided forming the incubator chamber and mounted on suitable supports 2. Within the incubator chamber is a shelf 3 on which are laid the eggs as shown in dotted lines, Fig. 6. The incubator chamber is heated by the following means: A lamp 4 is supported on a shelf 5 mounted on the side of the incubator chamber, the lamp 4 having a metallic cylindrical chimney 5' with an aperture 6" in one side covered with mica, and with apertures 5" adjacent to its upper end for the escape of heat. The chimney 5' projects up into the lower end of a cylinder 6, the upper end of the chimney 5' being formed with an annular flange 7 which rests upon an annular flange 8 projecting from the inner side of the lower end of the casing 6 and serving as a support for the upper end of the chimney. The lower end of the casing 6 is preferably formed by having a portion 6' thereof folded upon itself. To retain the heat within the casing 6 it is preferably provided with an asbestos lining 9. The casing 6 is provided adjacent to its upper end with lateral openings 10 for the escape of heat. Mounted in the lower portion of the casing 6 above the upper end of the chimney 5' is a hood 11 formed like a frustum of a cone and open at each end. The upper end of the hood 11 is located at the lower open end of a cone-shaped funnel 12 having its upper end supported at the top 13 of the casing 6 by any suitable means, and as here shown, by a flange 14 resting upon the top 13. Secured to and depending from the top 13 in the casing 6 is a heating tank 15 preferably having its sides formed with vertical corrugations in order to present a large heat radiating surface to the small body of water contained in the tank 15. The lower end of the tank 15 is secured to the lower end of the cone-shaped funnel 12 forming therewith the water heating tank. To heat the incubator chamber there are located in the latter, longitudinal pipes 16, connecting with transverse pipes 19 intermediate of the ends of the incubator chamber. A diaphragm 20 in the pipe 18 separates the adjacent openings at one end of the pipes 21 and 22 communicating with the pipe 18, the other end of the pipe 21 communicating with a small vertical chamber or passage way 23 located in the side of the tank 15 and open at its lower end at a short distance above the bottom of the tank 15. The pipe 22, which is similar to the pipe 21 projects through the wall of the casing 6 and into the tank 15 and has its inner end opening into the latter. It will be seen that by means of this construction the water heated in the tank 15 will be circulated through the pipes 16, 17, 18, and 19 and through the pipe 21 and the casing 23 as shown by the arrows and about the tank 15 and back through the pipe 22 to the pipe 18.

In order to reduce the temperature in the incubator chamber means for automatically controlling the heat supplied to the heating chamber of the tank is provided and as here shown consists of a thermostat of any suitable construction, as, for example, disks 24 mounted on a stem 25 in an arm 27 projecting from the side of the casing 1 and adjustable in said arm by means of a set screw 26. The arm 27 is formed with a curved end portion 28 to the end of which is pivoted at 29 an arm 30 having a depending fulcrum pin 31, the arm 30 having an inclined depending arm 32 from the lower end of which extends a horizontal arm 33, through a slotted plate 34 in the side of the casing. Adjustably mounted on the end of the arm 33 is a vertical rod 35 having a screw threaded portion 35' on which is mounted a thumb nut 36 located beneath the arm 33 and adapted to limit the upward movement of the rod 35. The upper end of the rod 35 is secured to a hinged member 37 mounted on the pin 38 projecting from an arm 39 extending at an angle from the side of the casing. A lever rod 40 extends through the hinged member 37 and has mounted on one end the counter weight 41 and has its other end formed with a curved portion 42 which is pivotally connected to the upper end of a rod 43 extending down through the funnel 12 and hood 11 and having mounted on its lower end a disk or damper 44 adapted to close the upper end of the chimney 5' when lowered on to the same.

By means of the construction hereinbefore described when the temperature in the incubator chamber has reached a certain point, the thermostat in the incubator chamber will, by its expansion, cause the arm 33 to be lifted, thereby raising the rod 35 and acting on the lever rod 40, moving the damper 44 downward to close the top of the chimney 5', thereby preventing the escape of heat upward and around the water heating tank. When the chimney 5' is closed as aforesaid the heat from the lamp escapes through the opening 5'' and the heat in the upper part of the casing 6 escapes through the openings 10.

It will be seen by means of the foregoing description that a simple and effective incubator is provided by means of which when a certain temperature is reached the heat will be quickly removed from the heating tank and the incubator chamber prevented from becoming overheated. It will also be seen that by means of this invention an ample heat radiating surface will be provided for a comparatively small body of water.

It will be understood that the incubator chamber may be used as a brooder as well as an incubator, the construction and arrangement of parts being such as to adapt it for either use.

Having described the invention, what we claim is:

In an apparatus of the character described, a cylindrical casing lined with asbestos and having air outlet openings at its upper end and an annular internal flange adjacent to its lower end, a lamp having a metallic chimney with outlet openings adjacent to the upper end thereof and a flange at its upper end, resting on the annular internal flange of the casing, a hood mounted in said casing above said chimney and open at each end, a water tank with vertical corrugated sides depending from the top of said casing and spaced from the sides of the latter, and formed with a vertical funnel open at each end and projecting through said tank and secured at its ends to the top of said casing and to the lower end of said tank, the lower end of the funnel being located above the hood, a vertically movable rod projecting through said funnel and hood above said lamp chimney and having a damper at its lower end above said chimney to close the latter, a heating chamber, hot water circulating pipes located in said chamber and connected with said water tank, and a thermostat in said chamber operatively connected with the damper rod.

In testimony whereof we hereunto affix our signatures in presence of two witnesses.

ARTHUR W. TIBBALS.
CARL DWIGHT YOUNG.

Witnesses:
 EUGENE S. OWEN,
 F. A. OWEN.

---

Copies of this patent may be obtained for five cents each, by addressing the "Commissioner of Patents, Washington, D. C."